United States Patent
Fuke et al.

(10) Patent No.: US 6,432,309 B1
(45) Date of Patent: Aug. 13, 2002

(54) POLYSULFONE-BASE HOLLOW-FIBER HEMOCATHARTIC MEMBRANE AND PROCESSES FOR THE PRODUCTION THEREOF

(75) Inventors: Masaya Fuke; Toshiaki Kuroki; Tsuyoshi Tanaka, all of Nobeoka (JP)

(73) Assignee: Asahi Medical Co, Ltd, Tokyo (JP)

( * ) Notice: Subject to any disclaimer, the term of this patent is extended or adjusted under 35 U.S.C. 154(b) by 0 days.

(21) Appl. No.: 09/423,267

(22) PCT Filed: May 18, 1998

(86) PCT No.: PCT/JP98/02181

§ 371 (c)(1),
(2), (4) Date: Nov. 4, 1999

(87) PCT Pub. No.: WO98/52683

PCT Pub. Date: Nov. 26, 1998

(30) Foreign Application Priority Data

May 19, 1997 (JP) .............................................. 9-142963
Apr. 28, 1998 (JP) ........................................... 10-132599

(51) Int. Cl.[7] .............................................. B01D 29/00
(52) U.S. Cl. ........................... 210/500.41; 210/500.42; 210/500.23; 210/645; 264/173
(58) Field of Search ....................... 210/500.41, 500.42, 210/500.23, 645; 264/173

(56) References Cited

U.S. PATENT DOCUMENTS

| | | | | |
|---|---|---|---|---|
| 4,906,375 A | * | 3/1990 | Heilmann | |
| 5,232,597 A | * | 8/1993 | Eguchi | |
| 5,232,601 A | * | 8/1993 | Chu et al. | |
| 5,340,480 A | * | 8/1994 | Kawada et al. | |
| 5,436,068 A | * | 7/1995 | Kobayashi et al. | |
| 5,938,929 A | * | 8/1999 | Shimagaki et al. | |
| 6,103,117 A | * | 8/2000 | Shimagaki et al. | |

FOREIGN PATENT DOCUMENTS

| | | |
|---|---|---|
| DE | 4007383 A1 | 9/1991 |
| EP | 509 663 A1 | 10/1992 |
| EP | 0550798 A1 | 7/1993 |
| EP | 0764461 A1 | 3/1995 |
| EP | 750 936 A1 | 1/1997 |
| JP | 61-238306 A | 10/1986 |
| JP | 63-97205 A | 4/1988 |
| JP | 63-97634 A | 4/1988 |
| JP | 63-97666 A | 4/1988 |
| JP | 5-54373 B2 | 8/1993 |
| JP | 6-165926 | 6/1994 |
| JP | 6-339620 | 12/1994 |
| JP | 7-289866 | 11/1995 |
| JP | 9070524 | 3/1997 |
| WO | WO 94/07594 | 4/1994 |

* cited by examiner

Primary Examiner—Ana Fortuna
(74) Attorney, Agent, or Firm—Pennie & Edmonds LLP (57) ABSTRACT

Provided are a polysulfone type blood-purifying membrane which is improved in blood compatibility and separation properties and less in polyvinyl pyrrolidone eluting in the internal surface of the hollow fiber membrane, as well as a process for producing the same.

15 Claims, 5 Drawing Sheets

POLYSULFONE-BASE HOLLOW-FIBER HEMOCATHARTIC MEMBRANE AND PROCESSES FOR THE PRODUCTION THEREOF

TECHNICAL FIELD

This invention relates to a polysulfone type hollow fiber membrane for purifying blood and a process for producing the same. More particularly, it relates to a polysulfone type blood-purifying membrane which is improved in blood compatibility and separation properties and a process for producing the same.

BACKGROUND ART

In recent years, ultrapurificaiton methods, reverse osmosis methods, gas separation methods and the like which are separation techniques using a selectively permeable separation membrane have been put into practice in various fields, and separation membranes made from a material suitable to each of said various uses have been placed on the market. As a material for the selective, permeable separation membrane, there are used polymers of cellulose type, cellulose acetate type, polyamide type, polyacrylonitrile type, polyvinyl alcohol type, polymethyl methacrylate type, polysulfone type, polyolefin type and the like. Among them, polysulfone type polymers are excellent in physicochemical properties, such as thermal resistance, acid resistance, alkali resistance, oxidation resistance and the like, and therefore, attention has been paid thereto as recent medical and industrial separation membrane materials.

However, the polysulfone type polymers are hydrophobic materials, so that selectively permeable separation membranes made therefrom are inferior in water-wettability to selective, permeable separation membranes made from hydrophilic polymers. Therefore, such disadvantages have been pointed out that when the polysulfone type polymers are applied to medical uses, adsorption of plasma protein is easy to be caused, it is difficult for bubbles to go away, and hence, the bubbles left in the membranes would migrate into blood, activate platelets and cause coagulation of blood.

Therefore, an examination has been made for imparting hydrophilicity to a selective, permeable separation membrane made from a polysulfone type polymer to enhance its water-wettability. As one of the methods, there has been proposed a selectively permeable separation membrane prepared by incorporating a hydrophilic polymer into a polysulfone type polymer and a process for producing the same. However, it has such problems that when the amount of the hydrophilic polymer contained is small, the water-wettability becomes inferior thereby causing coagulation of blood, while when the amount of the hydrophilic polymer contained is large, the amount of the hydrophilic polymer eluted from the produced membrane becomes large.

JP-A-61-238,306 and JP-A-63-97,666 disclose a method for producing a polysulfone type separation membrane using, as a membrane-production polymer solution, a system formed by adding a polysulfone type polymer, a hydrophilic polymer and an additive which is a non-solvent or swelling agent for the polysulfone type polymer. However, they are silent on a method of decreasing the amount of the hydrophilic polymer eluted. In addition, JP-A-63-97,205, JP-A-63-97,634 and JP-A-4-300,636 (corresponding to European Patent Publication No. 0 509 663) disclose a method in which the polysulfone type separation membrane prepared by the above method is subjected to radiation treatment and/or thermal treatment to insolubilize the hydrophilic polymer, thereby decreasing the amount of the hydrophilic polymer eluted. However, since the hydrophilic polymer is insolubilized by this cross-linking, the blood compatibility becomes deteriorated.

JP-A-6-165,926 discloses a method for producing a hollow fiber membrane by subjecting a polysulfone type hollow fiber membrane, comprising a polyglycol and a vinylpyrrolidone type polymer, to water-washing and hot-water-washing treatments and then to treatment with a solution having a poor solvent action on the above polysulfone type polymer. However, this method is a step for adjusting the amount of the PVP existing on the internal surface side of the hollow fiber membrane so as to become 1.1 times the existing ratio and is not suitable for the purpose of extracting the excess PVP.

With respect to the draft ratio in spinning, in JP-B-5-54,373 (corresponding to European Patent Publication No. 0 168 783), a method is disclosed for producing a blood-treating, hollow fiber membrane which has been prepared by spinning a low-viscosity polymer solution consisting of a hydrophobic polymer, a hydrophilic polymer and a common solvent for them, and which contains the hydrophilic polymer in a proportion of 1 to 10% by weight and has a water-absorbing capacity of 3 to 10%, and in this publication, it is stated to be preferable that the velocity of extrusion of the spinning composition from the spinneret and the speed of taking off the resulting fibers are the same as each other, namely the draft ratio is 1. However, when the draft ratio is actually 1, it is difficult to increase the spinning velocity. When the amount of the polymer solution extruded is increased for increasing the spinning velocity, there are caused such problems that the pressure loss at the spinneret becomes large; the linear velocity of extrusion of the spinning polymer solution is increased; extrusion unevenness of the spinning polymer solution is easily caused; spinning becomes instable; membrane structures are disordered; and the like. In addition, in JP-A-6-165,926, it is proposed that the draft ratio is usually in the range of 2 to 5 because when the draft ratio is extremely increased or conversely decreased, the structure becomes instable; however, when the draft ratio exceeds 2, problems are encountered such as forming a structure in which the internal surface of the hollow fiber membrane has been torn, thereby causing albumin, a useful protein, to leak out easily.

Recently, low-molecular weight proteins such as β-2-microglobulin and the like have been mentioned as causes of dialysis complication, and a dialysis membrane having high performance, so that it can remove them from the blood with good efficiency is desired. In the above-mentioned prior art, no sufficient examination has been made on fractionating properties and the examination has not been necessarily satisfactory. That is to say, this is because when the permeability of a membrane is enhanced for the purpose of improving the removal of the low-molecular weight proteins, the leak of useful proteins such as albumin and the like becomes an issue.

DISCLOSURE OF INVENTION

This invention aims at solving the issues of the prior art; improving blood compatibility; providing a polysulfone type blood-purifying membrane whose separation characteristics have been improved; and providing a process for producing the same.

The present inventors have diligently made an examination for achieving the above-mentioned purposes and have consequently found that a clean, hollow fiber membrane which is low in the amount of polyvinyl pyrrolidone (referred to hereinafter as PVP) eluted from the internal surface and excellent in blood compatibility, can be provided by water-insolubilizing a portion of the PVP of a PVP-containing polysulfone type hollow fiber membrane for purifying blood and adjusting the PVP concentration on the internal surface of the hollow fiber membrane to an appropriate value. Moreover, they have found that a clean, hollow fiber membrane which is lower in the amount of PVP eluted from the internal surface can be provided by extracting the PVP with an adequate solvent, thereby washing the hollow fiber membrane. In addition, they have found that by subjecting a polymer solution having an adequate viscosity to spinning at an appropriate draft ratio, there can be provided a polysulfone type hollow fiber membrane for purifying blood which membrane has sharp fractionating properties and in which membrane the thickness of selective separation layer having an effect of substantially screening the eluting molecules in the membrane, can be appropriately controlled; simultaneously the internal surface of the hollow fiber membrane has no torn structure; and the removal of unnecessary materials and recovery of useful materials can be conducted with good efficiency because the internal surface of the hollow fiber membrane has no torn structure.

That is to say, this invention is a polysulfone type hollow fiber membrane for purifying blood in which membrane a selective separation layer exists on the internal surface side of the hollow fiber membrane and which membrane contains polyvinyl pyrrolidone, wherein the polyvinyl pyrrolidone is contained in a proportion of 1 to 10% by weight, 5% to 50% by weight of the polyvinyl pyrrolidone is soluble in water, and the concentration of the polyvinyl pyrrolidone on the internal surface is in the range of 30% to 45%.

This invention is also a process for producing a polysulfone type hollow fiber membrane for purifying blood, which comprises subjecting a polymer solution comprising 15 to 20% by weight of a polysulfone type polymer in which solution the weight ratio of polyvinyl pyrrolidone to the polysulfone type polymer is from 0.25 to 0.5, to extrusion at a viscosity of 1,500 to 6,000 mPa·s, and to spinning at a draft ratio of 1.1 to 1.9 and at a linear extrusion velocity of not more than 90 m/min.

Moreover, this invention is a process for producing a polysulfone type hollow fiber membrane for purifying blood, which comprises spinning a hollow fiber membranes using a polymer solution which comprises 15 to 20% by weight of a polysulfone polymer in which solution the weight ratio of polyvinyl pyrrolidone to the polysulfone type polymer is from 0.25 to 0.5, and thereafter insolubilizing a portion of the polyvinyl pyrrolidone in the hollow fiber membrane by a physicochemical method.

BEST MODE FOR CARRYING OUT THE INVENTION

The polysulfone type polymer referred to in this invention is a generic name for high-molecular weight compounds having sulfone bonds and is not particularly limited; however, as examples thereof, polysulfone type polymers having recurring units represented by:
Formula 1 or
Formula 2 are widely put on the market, and they are preferably used because of easy availability. Polysulfone resins having the former structure are put on the market as a trademark "UDEL" from AMOCO PERFORMANCE PRODUCTS COMPANY and a trademark "Ultrason" from BASF, and several kinds exist depending upon the degree of polymerization and the like.

Moreover, the PVP of this invention is a water-soluble, high-molecular weight compound obtained by subjecting N-vinyl pyrrolidone to vinyl-polymerization and is put on the market as a trademark "Plasdone" from ISP COMPANY and as a trademark "Kollidon" from BASF, and each of them includes polyvinyl pyrrolidone having several molecular weights.

When the PVP content of the hollow fiber membrane is low, the PVP concentration on the internal surface of the hollow fiber membrane which contacts with blood is not increased and the hydrophilicity of the membrane becomes deteriorated, so that when the membrane contacts with blood, it easily causes coagulation of blood. Furthermore, as stated hereinafter, to increase the PVP content of the hollow fiber membrane, it is sufficient to make the PVP concentration high in the polymer solution which is used in the spinning; however, the viscosity of the polymer solution is also increased and the spinning becomes impossible. Therefore, in this invention, PVP is contained in the range of 1 to 10% by weight in the hollow fiber membrane. The PVP content is preferably in a range of 2.5 to 8% by weight.

The PVP content of the hollow fiber membrane can be easily calculated from elementary analysis values of nitrogen and sulfur. It can be also easily determined by analyzing the hollow fiber membrane by a pyrolysis gas chromatography and analyzing the peak due to PVP.

PVP is a polymer easily dissolved in water and, in general, PVP is easily eluted with water or blood from a hollow fiber membrane obtained by subjecting a PVP-containing polysulfone type polymer solution to spinning in a known manner. It is known that these PVP's are insolubilized by, for example, cross-linking by irradiation. However, when the PVP contained is completely insolubilized, the elution from the hollow fiber membrane is completely stopped, but the effect of making the membrane surface hydrophilic is also weakened. Therefore, in this invention, only a portion of PVP is insolubilized by cross-linking so that the amount of water-soluble PVP becomes 5 to 50% of the total amount of PVP contained in the hollow fiber membrane. In this range, the elution from the hollow fiber membrane is inhibited and the effect of making the membrane surface hydrophilic is also sufficiently maintained.

PVP is cross-linked by physicochemical means. The physicochemical method referred to herein means radiation, heat or the like, and the radiation referred to here includes α-ray, βe-ray, γ-ray, X-ray, ultraviolet ray, electron beam and the like. When cross-linking with a radiation is conducted, it is preferable to maintain the entire membrane in a sufficiently wet state and it is better to maintain the same in at least the saturated water content. The saturated water content state of the hollow fiber membrane in the irradiation with a radiation is the state in which the blood-purifying membrane would be used, namely is realized most simply by filling a module with water, after modularization, and immersing the hollow fiber membrane in water. However, it can also be achieved by filling, after the modularization, only the internal side, namely the blood side, of the hollow fiber membrane with water or conversely only the external side, namely the so-called dialysate side, of the hollow fiber membrane with water. Alternatively, it is sufficient that both sides or one side of the hollow fiber membrane in the module is filled with water and the water is thereafter discharged; the water adsorbed to the surface of the hollow fiber membrane is sufficient, the water-containing gel state of PVP in the membrane does not change and the hollow fiber membrane is in a state substantially equivalent to being immersed in water. With less than the saturated water content, attention is required to be paid because the cross-linking state becomes instable and the control of the degree of cross-linking becomes impossible.

In order to bring about the state of partial insolubilization referred to in this invention, it is necessary to control the degree of cross-linking within the desired range. The degree of cross-linking is controlled by allowing a cross-linking inhibitor to co-exist in an adequate amount during the cross-linking. As a cross-linking inhibitor, there are used, for example, glycerin, propylene glycol, an aqueous solution in which sodium disulfite and sodium carbonate are dissolved, and the like. However, these are not required to be used alone and may be used in admixture of two or more. For example, hollow fiber membranes are incorporated into a module, filled with an aqueous solution in which 100 to 1,000 ppm of sodium disulfite and 50 to 500 ppm sodium carbonate are dissolved, and irradiated with γ-rays. The dose of γ-rays is set appropriately taking the objective degree of cross-linking into consideration; however, a range of 10 kGy to 100 kGy is preferred.

The amount of the water-soluble PVP referred to in this invention is the amount of the PVP in the membrane which has not been insolubilized by cross-linking and is determined as follows. That is to say, the hollow fiber membrane is completely dissolved in N-methyl-2-pyrrolidone. Subsequently, water is added to this polymer solution to precipitate the polysulfone type polymer. After allowing it to stand, the amount of the PVP in the resulting supernatant is determined by a liquid chromatography.

The important factor for the blood compatibility of the hollow fiber membrane is the hydrophilicity of the membrane surface which contacts with blood, and in the PVP-containing polysulfone type hollow fiber membrane, the PVP concentration on the internal surface of the membrane is important. When the surface PVP concentration is too low, the membrane surface exhibits hydrophobicity and tends to adsorb plasma protein, and coagulation of blood is easily caused. That is to say, the blood compatibility of the membrane becomes deteriorated. Conversely, when the surface PVP concentration is too high, the amount of PVP eluted with blood or the like is increased to give a result undesirable for the object and use of this invention. Accordingly, the surface PVP concentration in this invention is in the range of 30% to 45%, preferably 33% to 40%.

The PVP concentration on the internal surface of the hollow fiber membrane is determined by an X-ray electron spectroscopy for chemical analysis (ESCA). That is to say, the ESCA measurement of the internal surface of hollow fiber membrane is as follows: Samples are arranged on a double-sided tape, then cut in the fiber axial direction by a cutter, and opened so that the internal side of the hollow fiber membrane becomes the surface, after which the opened samples are arranged and then subjected to measurement in a conventional manner. That is, from the integrated intensities of C1s, O1s, N1s and S2p spectra, the surface concentration (A) of nitrogen and the surface concentration (B) of sulfur are determined using the relative sensitivity factor appendant to apparatus, and the surface PVP concentration is calculated from the equation:

$$\text{Surface PVP conc.} \times A \times 111 \times 100/(A \times 111 + B \times 442).$$

In this invention, by insolubilizing a portion of the PVP by cross-linking as mentioned above, elution from the hollow fiber membrane is inhibited. This invention is characterized particularly in that the elution of PVP in the internal side of the hollow fiber membrane is inhibited. In more preferable embodiments of this invention, the amount of eluted polyvinyl pyrrolidone, when the internal side of the hollow fiber membrane is subjected to a cyclic extraction with 40% aqueous alcohol solution, is not more than 0.5 mg per m² of membrane area. Specifically, when the hollow fiber membranes are incorporated into a module and 40% aqueous ethanol solution is circulated onto the internal side, namely the blood side, of the hollow fiber membrane at 37° C. for 4 hours, the amount of PVP eluted is not more than 0.5 mg per m² of membrane area. As an extraction medium, blood at 37° C. is suitable; however, since the amount of the hydrophilic, high polymer is too slight and the amount of inhibiting materials is large, the quantitative determination of the extracted PVP is difficult. In addition, as an extracting medium, water is also weak in extraction capacity and hence the quantitative determination of the PVP extracted is difficult. A 40% aqueous ethanol solution is suitable as an extracting medium.

The polysulfone type hollow fiber membrane for purifying blood of this invention is prepared by a dry and wet type spinning method as stated hereinafter. In the membrane just after the spinning, it is inferred that there are present (a) PVP which exists among polysulfone type polymer particles and is easily removed by a treatment such as water-washing or hot water-washing, (b) PVP which enters weakly the polysulfone type polymer particles and is hardly removed by a treatment such as water-washing or hot water-washing but can be eluted, and (c) PVP which enters the polysulfone type polymer particles and is not removed by extraction. By the conventional technique, the (b) type PVP is not sufficiently removed even though the (a) type PVP could be washed off, and therefore, PVP which has not been insolubilized is considered to be gradually eluted from the membrane under use. In this invention, in order to reduce the amount of PVP eluted from the membrane, a method is proposed by which the (b) type PVP is washed off as much as possible.

In this invention, the first washing method for extracting and removing PVP is a method for washing the polysulfone type hollow fiber membrane which has been subjected to a membrane-production process, with a mixed solvent of a good solvent and a poor solvent for the polysulfone type polymer. As a matter of course, this mixed solvent is such that the mixing ratio thereof is set in such a range that the polysulfone type polymer is not dissolved therein and the PVP which has not been insolubilized is dissolved therein. It is considered that such a mixed solvent can purify the interior of the membrane by drawing PVP out of the polysulfone type polymer particles and the interior of the dense layers by causing the polysulfone type polymer particles to swell, softening the polysulfone type polymers in the membrane surface layer, enhancing the flow-diffusing properties of PVP, or the like, and can, as a result, greatly inhibit the elution.

The good solvent for the polysulfone type polymer to be used in the first washing method can be exemplified by dimethylacetamide (referred to hereinafter as DMAC), N-methyl-2-pyrrolidone, dimethyl sulfoxide (referred to hereinafter as DMSO), dimethylformamide and the like, and these are used alone or in admixture. Among them, DMAC and/or DMSO is preferably used. Moreover, the poor solvent for the polysulfone type polymer can be exemplified by water, isopropyl alcohol, ethanol, propylpropylene glycol, tetraethylene glycol and the like and among them, water is preferably used. The mixing ratio between the good solvent and the poor solvent for the polysulfone type polymer is not definitively determined because the conditions are varied depending upon the kinds of the solvents and the treating temperature; however, it is preferable to use the good solvent for the polysulfone type polymer in a proportion of 30 to 95% by weight. There are used, for example, 30 to 60% by weight aqueous DMAC solution, 30 to 60% by weight aqueous N-methylpyrrolidone solution, 50 to 95% by weight aqueous DMSO solution and the like. Moreover, each of the good solvent and the poor solvent for the polysulfone type polymer need not always be used alone, and a mixed solution of a mixture of at least two good solvents with a mixture of at least two poor solvents may be used.

The treating temperature may be any temperature; however, when an aqueous solution of the good solvent for the polysulfone type polymer is used, a treating temperature not higher than the boiling point of water is preferable for operation; a range of 10 to 98° C. is preferable; a range of 30 to 98° C. is more preferable and a range of 50 to 95° C. is most desirable.

In this invention, the second washing method is a method of washing the polysulfone type hollow fiber membrane subjected to a membrane-production process with an alcoholic solvent. The polysulfone type polymer particles constituting the membrane are swollen, whereby the weakly incorporated PVP becomes easily released and simultaneously the diffusion velocity of PVP becomes large. Therefore, it is inferred that the PVP difficult to remove by the treatment of water-washing or hot water-washing is washed off. The treating temperature is not particularly limited; however, a high temperature is preferred. In addition, when the treating temperature is too high, a change of the membrane structure occurs and the membrane performance is fluctuated, so that in this invention, a washing treatment at a temperature of 130 to 160° C. is desired. It is preferably at 135 to 155° C., more preferably at 140 to 150° C.

The alcoholic solvent which can be used in this invention is a good solvent for PVP, and there are mentioned all those having a swelling action on the polysulfone type polymers; however, from the viewpoint of simplicity of operation and apparatus, alcoholic solvents having a boiling point or decomposition point of not less than 130° C. are preferable. Among them, glycerin is preferably used. The smaller the water content of the alcoholic solvent, the better, and the water content is preferably 5% or less, more preferably 0.5% or less.

In both the first and second washing methods, it is not indispensable to previously remove a part of the easily removable PVP and the solvent for the polymer solution by water-washing or hot water-washing the polysulfone type hollow fiber membrane prior to the above washing methods. Rather, when the solvent for the polymer solution remains, such an effect can be expected that the membrane becomes a swollen state and the extraction of the PVP entered into the interstices among the polysulfone polymers is thereby accelerated.

The specific procedure for the first and second washing methods can be illustrated by the following procedures:
(1) Heating at any temperature the membrane as impregnated with the washing solution. (2) Immersing the membrane in the washing solution adjusted to the preset temperature. (3) Subjecting the membrane to a shower of the washing solution adjusted to the preset temperature. (4) Allowing the membrane to travel in the washing solution adjusted to the preset temperature. By any of these methods, the washing is possible and in brief, it is sufficient that the polysulfone type hollow fiber membrane subjected to a membrane-production process is sufficiently contacted with the washing solution adjusted to the preset temperature.

The treating time is varied depending upon the treatment method, and in the methods (1) to (3) which are batchwise operations, it is preferably not less than 10 minutes, more preferably not less than 30 minutes. Moreover, in the method (4), which is a continuous operation, it is necessary that the residence time be not less than 15 seconds, and a residence time of not less than 20 seconds is more preferable. As a matter of course, it is preferable to wash off the solvent used by water-washing and/or hot water-washing or the like after the treatment.

Observing the internal surface of the polysulfone type hollow fiber membrane for purifying blood of this invention by a scanning electron microscope, it is seen that such a structure is formed that the fibrous polysulfone type polymers (called fibrils) are arranged and brought together in the hollow fiber axial direction and interstices exist sporadically between the fibrils.

As stated hereinafter, under some conditions for membrane-production, the fibrils are separated by tearing and the interstices between the fibrils become too large. The hollow fiber membrane having such an internal surface loses its surface smoothness, whereby its blood compatibility becomes deteriorated and simultaneously the removability of solute molecules is also adversely affected. Therefore, it is preferable that the hollow fiber membrane of this invention has no torn interstices of 0.8 $\mu$m or more on its internal surface.

The screening of the solute molecules is determined depending upon the sizes of the solute molecules and the sizes of the pores of the membrane. That is to say, solute molecules smaller than the pore diameter of the membrane can permeate the membrane, but solute molecules larger than the pore diameter of the membrane cannot permeate. By this principle, screening of solute molecules is caused. However, in the case of a membrane whose structure is not uniform in the membrane cross section and the pore diameters are different in the membrane cross section, the screening is caused in the place where the pore diameter is smallest in the membrane cross section, namely, the selective separation layer referred to in this invention. In general, the membrane pore diameter is small where the polymer portion has a dense structure, so that the selective separation layer referred to in this invention can be distinguished based on the transmission electron microscopic image of the membrane section. That is to say, the proportion occupied by the polymer portion (polymer region percentage) is determined by partitioning the transmission electron microscopic image of the membrane section in a constant width and subjecting the same to image analysis. This operation is conducted in the membrane thickness direction from the internal side of the hollow fiber membrane toward the external side of the hollow fiber membrane, whereby the distribution of the systemization percentage in the sectional direction of the hollow fiber membrane is clarified. Since a pore diameter distribution exists in the membrane wall, in this invention, a membrane wall portion in which the systemization percentages fall in a range of not more than 30% from the highest systemization percentage obtained when the membrane wall is subjected to image analysis in an image analysis width of 0.5 to 1.0 $\mu$m in the thickness direction is defined as the selective separation layer and the thickness thereof is determined.

The fractionating properties of the membrane are explained using a multilayer structure model. That is, suppose a structure in which many layers formed by slicing a membrane in parallel to the membrane surface (accordingly, vertically to the membrane section) are laminated. The solute molecules are screened in each of the layers and it is considered that a multistage filtration be effected by the membrane as a whole. The average pore diameter is different between one layer and another; however, taking one of the layers, the pore diameters in the layer have a distribution, and hence, not only does a layer having the smallest average molecular weight have an effect of screening solutes, but also layers having a somewhat larger average pore diameter can trap larger solute molecules which have passed through other layers. In other words, solute molecules which have passed through pores having a larger diameter in a layer having a small average pore diameter are sufficiently trapped by pores smaller in size than the solute molecules, though the average pore diameter of the layer is somewhat larger. Accordingly, selective separation layers having the average pore diameters from the smallest to somewhat larger, are effective.

For the sharpness of fractionating properties, the thickness of the selective separation layer is important. In the case where the selective separation layer is thin, when it is intended to increase the average pore diameter in order to allow a material to be removed to permeate well, the permeation of albumin which is a useful plasma protein becomes easy. This is inferred to be because there is a pore diameter distribution in a selective separation layer and when the average pore diameter is increased, the number of pores through which albumin passes becomes large correspondingly thereto. When the selective separation layer is thin, it follows that albumin which has once leaked from the portion in which the pore diameter is large, permeates such a membrane because there is no other selective separation layer for trapping the leaked albumin. Also, when a structure defect is caused in the selective separation layer owing to the influence of slight fluctuations of spinning conditions or the like, a leak of a high molecular weight material becomes particularly evident. On the other hand, when the selective separation layer is thick, even if the membrane structure is relatively loose, the leak of albumin is little, namely, the molecular-weight fractionating properties become sharp, as far as the above thickness is large. This is because, since the selective separation layer of the membrane is thick, even if albumin has permeated one layer, it can be trapped in any other layer of the selective separation layer and consequently the probability of albumin permeating the membrane becomes low. However, when the selective separation layer is too thick, the permeation resistance becomes so large that it is necessary in this invention that the thickness of the selective separation layer is 2 $\mu$m to 15 $\mu$m. Further, it is preferably 3 $\mu$m to 12 $\mu$m, more desirably 5 $\mu$m to 10 $\mu$m.

The position of the selective separation layer may be either the internal side of the hollow fiber membrane or the center portion of the section or both the internal side and the external side of the hollow fiber membrane from the viewpoint of screening effect. However, in general, blood is allowed to flow on the internal side of the hollow fiber membrane, and therefore in order to prevent the protein in the blood, which causes a blocking of the pores in the membrane, from penetrating into the membrane, it is preferable in this invention that the selective separation layer is on the internal side of the hollow fiber membrane.

In the membrane-production of the polysulfone type hollow fiber membrane for purifying blood in this invention, there can be utilized a dry and wet membrane-production technique which has heretofore been generally known. That is to say, first of all, a uniform polymer solution is prepared by dissolving a polysulfone type polymer and PVP in a common solvent for the two. As the common solvent in which both the polysulfone type polymer and the PVP are dissolved, there are mentioned various kinds of solvents such as DMAC, DMSO, N-methyl-2-pyrrolidone, dimethylformamide, sulfolane, dioxane and the like and a solvent consisting of a liquid mixture of two or more of them. In addition, for controlling the pore diameter, an additive such as water or the like may be added to the polymer solution.

When the viscosity of the polymer solution is too low, large macro voids come to appear remarkably in the interior of the membrane. However, in the case of the hollow fiber membrane for purifying blood, the presence of many such macro voids facilitates the occurrence of coagulation of blood during the blood dialysis, so that it is preferable that no macro voids are present in the hollow fiber membrane to be used in the blood dialysis. The macro void referred to here means a space in which the polymer does not exist in the membrane and which has the maximum diameter of not less than 5 $\mu$m. On the other hand, when the viscosity of the polymer solution becomes too high, the pressure before the spinneret becomes too high and the stable spinning becomes impossible. Accordingly, in this invention, the viscosity of the polymer solution is required to be 1,500 to 6,000 mPa·s, and a range of 2,000 to 4,000 mPa·s is preferred. The viscosity referred to in this invention is a value obtained by subjecting the polymer solution to measurement by a rotary viscometer at the same temperature as the spinneret temperature under the membrane-production conditions.

The viscosity of the polymer solution depends upon the molecular weight of PVP, the concentrations of polysulfone type polymer and PVP in the polymer solution, the temperature of the polymer solution and the like, and all the factors affect severely the formation of the membrane structure. In this invention, by adequately selecting the starting materials to be used and setting the concentration and temperature conditions, the viscosity of the polymer solution is controlled in the above-mentioned range.

When the amount of the polysulfone type polymer resin added is too small, the formation of membrane becomes difficult and the membrane strength becomes weak, and conversely, when the amount is too large, such phenomena as the spinability being poor, the pore diameter becoming too small, and the like are caused; therefore the amount is preferably 15 to 20% by weight, more preferably 16 to 19% by weight. However, it is not essential that the addition amount is in this range, and the amount can be made smaller or larger than this range depending upon the properties of the objective hollow fiber membrane. Moreover, since the membrane properties are also varied by varying the other spinning conditions, it is sufficient to appropriately select the optimum combination.

The purpose of adding PVP to the polymer solution is to impart hydrophilicity to the membrane by allowing the PVP to remain in the hollow fiber membrane. Accordingly, the molecular weight of the PVP to be used is important. That is, when the molecular weight of the PVP is too small, the PVP is easily eluted from the membrane during the coagulation of the polymer solution and during the washing of the hollow fiber membrane obtained, so that in order to allow the PVP, which is necessary for imparting hydro-philicity to the hollow fiber membrane, to remain in the hollow fiber membrane, it becomes necessary to add a larger amount of PVP to the polymer solution. For this reason, a larger molecular weight is preferred in order to increase the residue of the PVP in the hollow fiber membrane, and the K value defined by the following equation is 88 to 95, preferably 89 to 94:

Equation 1

$$K\ value = \frac{\sqrt{300C\log Z + (C + 1.5C\log Z)^2} + 1.5C\log Z - C}{0.15C + 0.003C^2}$$

wherein Z is the relative viscosity ratio of a solution of the concentration C and C is a weight/volume % concentration.

The relative amounts between the polysulfone type polymer and PVP in the polymer solution is very important for determining the PVP concentration on the internal surface of the hollow fiber membrane obtained, because on the internal surface of the hollow fiber membrane, sudden coagulation is caused by contact of the liquid in hollow with the polymer solution, so that the ratio of the absolute amounts of the polysulfone type polymer and the PVP present on the coagulated surface is reflected in the internal surface concentration. When the weight ratio of the PVP to the polysulfone type polymer in the polymer solution is too small, the surface PVP concentration does not increase. Moreover, when the weight ratio of the PVP to the polysulfone type polymer is too large, the strength of the membrane becomes low, and the amount of the PVP eluted out of the membrane becomes impossible to neglect. Therefore, in order to keep at least the necessary strength and adjust the PVP concentration on the internal surface of the hollow fiber to 30% to 40%, it is necessary to adjust the weight ratio of the PVP to the polysulfone type polymer in the polymer solution to from 0.25 to 0.5, preferably from 0.3 to 0.48 and more preferably from 0.35 to 0.45.

In this invention, water or a coagulating solution comprising water as the main component can be used as the liquid in hollow, and it is sufficient to determine its composition and the like depending upon the membrane performance of the objective hollow fiber membrane and, though not determined wholly, in general, a mixed solution of water with the solvent used in the polymer solution is preferably used. For example, 0 to 60% by weight aqueous DMAC solution or the like can be used, and particularly, 0 to 50% by weight aqueous DMAC solution is preferably used.

The hollow fiber membrane can be prepared by simultaneously extruding into air the above-mentioned polymer solution and the liquid in hollow for coagulating the polymer solution from a tube-in-orifice type double spinning nozzle, allowing the extrudate to travel in a length of air gap portion of 20 to 80 cm, then immersing the same in a coagulating bath comprising water as the main component placed under the spinning nozzle to coagulate the same and thereafter winding up the coagulated product.

The draft ratio referred to in this invention is the ratio between the speed of winding-up the hollow fiber membrane and the linear extrusion velocity when the polymer solution is extruded from the cyclic slit nozzle of the tube-in-orifice type double spinning nozzle, and is a value obtained by dividing the winding-up speed by the linear velocity of extrusion of the polymer solution. In the case of a low draft ratio, it is necessary to narrow the slit width of the spinneret as much. In the case of a hollow fiber membrane for purifying blood, the range of the membrane thickness usually used is 20 to 60 μm. Therefore, in the case of a low draft ratio, the linear velocity of extrusion of the polymer solution is increased by increasing the spinning velocity and the pressure loss at the spinneret becomes large, so that the spinning tends to become instable. In addition, extrusion unevenness of the polymer solution is caused, and hence, the membrane structure is disordered, and the variation of water-permeability and solute-permeability becomes large. Moreover, since the slit width is small, such problems as the alignment of spinneret becoming difficult, the preparation per se of spinneret becoming difficult, the cost therefor becoming high, and the like are pointed out. Conversely, when the spinning draft ratio is too high, that is, the winding-up speed is too high as compared with the linear velocity of extrusion of the polymer solution from the spinneret, it follows that directly under the spinneret, the internal surface of the hollow fiber membrane is strongly drawn with coagulation, whereby the dense layer of the internal surface of the membrane forms a torn pattern, and pores having a particularly large diameter tend to be formed, and a problem of leak of albumin, which is a useful protein, is caused. This problem can be improved to some extent by maintaining the viscosity of the polymer solution low by such a method as changing the composition of the polymer solution, elevating the temperature of the polymer solution, or the like, but it is not sufficient. Accordingly, in this invention, it is necessary that the draft ratio be in the range of 1.1 to 1.9 and it is preferably in the range of 1.1 to 1.5.

Furthermore, the linear velocity of extrusion of the polymer solution referred to in this invention is a linear velocity when the polymer solution is extruded from the spinneret during the spinning and is a value obtained by dividing the flow rate of the polymer solution extruded per unit time by the sectional area of the spinneret from which the polymer solution is extruded. When the linear velocity of extrusion of the polymer solution is increased, the extrusion unevenness of the polymer solution becomes large and the structure unevenness of the membrane is caused, whereby pores having a large pore diameter are formed and a leak of albumin results. In this invention, it is necessary that the linear velocity of extrusion of the polymer solution be not more than 90 m/min, and it is preferably not more than 70 m/min, more preferably not more than 60 m/min. No particular lower limit of the linear velocity of extrusion of the polymer solution exists, but when the linear velocity of extrusion of the polymer solution is too low, the extrusion of the polymer solution becomes instable, and hence, it is preferably at least 10 m/min.

In this invention, the thickness of the selective separation layer is governed by various conditions in the membrane-production as shown below. First of all, the kind and concentration of the liquid in hollow are important, and when the solvent concentration in the liquid in hollow is increased, the coagulation power becomes weak, so that the coagulation proceeds gently. As a result, no dense aggregation structure can be formed, and the selective separation layer becomes a rough structure. Secondly, the viscosity of the polymer solution is important, and when the viscosity is high, the movement of the polysulfone type polymer can be inhibited during the coagulation and the selective separation layer becomes thicker than when the viscosity is lower under the same conditions. The viscosity of the polymer solution depends upon the molecular weight of the hydrophilic polymer, the concentrations of the polysulfone type polymer and hydrophilic polymer in the polymer solution, the temperature of the polymer solution, and the like, and any of the factors affects severely the formation of the selective separation layer. Moreover, the draft ratio is an important factor, too, and it is better to increase the draft ratio for keeping the selective separation layer thick. The factor which affects the formation of the selective separation layer includes, in addition thereto, the distance of the length of air gap portion between the spinneret and the coagulation bath, the spinneret size, the temperature and composition of the coagulation bath, the spinning velocity, the solvent used in the polymer solution, and the like, and it is necessary that these be appropriately set taking into consideration an even balance with solute permeability, the object and the like.

The hollow fiber membrane spun and wound up as mentioned above is post-treated in a known manner. That is, the solvent and the excess PVP are removed by washing with hot water or the like and, if necessary, glycerin is given to the hollow fiber membrane, after which drying with dry heat is conducted. In addition, such a method whereby the winding up is conducted after the washing with hot water or the like and the drying with dry heat, instead of conducting the post-treatment after winding up the hollow fiber membrane, is within the scope of this invention, and a particularly important embodiment of this invention is such that the viscosity of a polymer solution is adjusted to 1,500 to 6,000 mPa·s and the draft ratio is adjusted to not more than 1.1 to 1.9 under the condition where the linear velocity of extrusion from the spinneret is not more than 90 m/min.

This invention is explained in detail below using Examples and Comparative Examples; however, this invention is not limited thereto.

In this invention, the water permeability and the coefficient of screening are those determined as follows. That is to say, a minimodule (effective length: 25 cm) consisting of 100 dried polysulfone type, selectively permeable hollow fiber membranes is formed by assembling and then subjected to measurement of water permeability in a unit of ml/Hr/m²/mmHg by a flow method under the pressure condition of 200 mmHg. Subsequently, bovine plasma was used to measure the coefficients of screening of β2-Mg and albumin.

As to fiber strength, the hollow fiber membrane was stretched until torn using TENSILON from ORIENTEC COMPANY (RTC-1210) and the maximum load required at that time was used as the strength.

EXAMPLE 1

Figure 1A:
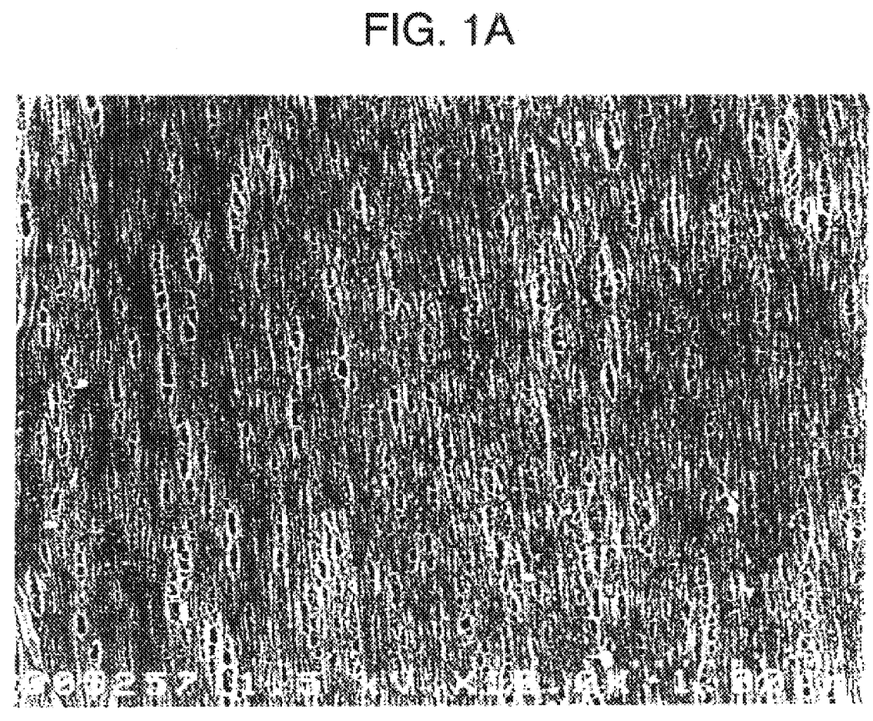
FIGS. 1A and 1B are images obtained by observing the internal surface of the hollow fiber membrane of Example 1 through a scanning electron microscope (FIG. 1A: at magnification of 10,000, FIG. 1B: at magnification of 30,000). It is observed that the internal surface is smooth and fibrils are arranged and assembled in the hollow fiber axial direction.
Figure 1B:
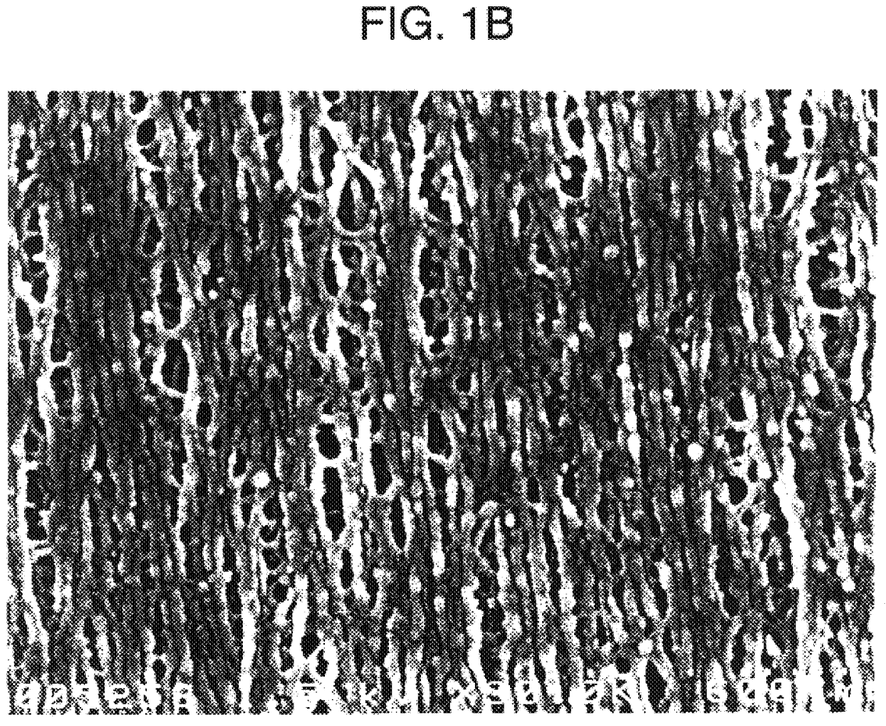

A uniform polymer solution was prepared which was composed of 17 parts by weight of a polysulfone resin (manufactured by AMOCO PERFORMANCE PRODUCTS COMPANY, P-1700), 7 parts by weight of polyvinyl pyrrolidone (manufactured by BASF COMPANY, K-92) and 76 parts by weight of DMAC. The viscosity of this polymer solution was 3,400 mPa·s at 65° C. This polymer solution was extruded, while maintained at 65° C., together with a liquid in hollow composed of an aqueous DMAC solution having a concentration of 15% by weight, from a cyclic nozzle having a slit width of 59.5 μm, immersed in water at 55° C. that was provided 60 cm below the nozzle and then wound up at a speed of 70 m/min. Since the amount of the polymer solution extruded was adjusted so that the thickness of the dried hollow fiber membrane became 45 μm, the linear velocity of extrusion of the polymer solution became 49.3 m/min and the draft ratio was 1.42. The hollow fiber membrane bundle obtained was hung and then subjected to a shower of 40% by weight aqueous DMAC solution heated to 85° C. for 80 minutes. Thereafter, it was washed with hot water at 90° C. and then immersed in 20% aqueous glycerin solution for the glycerin to adhere thereto. Subsequently, it was dried with hot air at 75° C. for 11 hours. Successively, the hollow fiber membrane was immersed in an aqueous solution in which 600 ppm of sodium disulfite and 300 ppm of sodium carbonate were dissolved, and then irradiated with γ-rays of 25 kGy to obtain a polysulfone type blood-purifying membrane. The hollow fiber membrane obtained was dyed with an aqueous osmium tetroxide, subjected to dehydration, thereafter embedded in an epoxy resin and formed, after curing, into ultrathin slice of about 60 nm using an ultramicrotome, after which TEM (JEM 2000FX) observation was conducted. Using the TEM image obtained, the systemization percentage was measured by use of an image-analyzing apparatus (IP-1000, manufactured by ASAHI CHEMICAL INDUSTRY CO., LTD.) at an interval of 0.7 μm in the direction from the internal surface side to the external surface side of the hollow fiber membrane. The measurement results and evaluation results of membrane are shown in Table 1. Moreover, the state of the internal surface of this membrane is shown in FIGS. 1A and 1B. A torn structure was not found and a smooth surface was found.

EXAMPLE 2

In the same manner as in Example 1, except that the extraction and washing of the hollow fiber membrane were conducted with a shower of glycerin at 130° C. for 3 hours in place of the shower of 40% aqueous DMAC solution at 85° C. for 80 minutes, a polysulfone type hollow fiber membrane for purifying blood was obtained. The results obtained are shown in Table 1.

EXAMPLE 3

In the same manner as in Example 1, except that the extraction and washing with a shower of 40% aqueous DMAC solution at 85° C. for 80 minutes were not conducted, a polysulfone type hollow fiber membrane for purifying blood was obtained. The results obtained are shown in Table 1.

EXAMPLE 4

A uniform polymer solution was prepared which was composed of 17 parts by weight of a polysulfone resin (manufactured by AMOCO PERFORMANCE PRODUCTS COMPANY, P-1700), 7 parts by weight of polyvinyl pyrrolidone (manufactured by BASF COMPANY, K-89) and 76 parts by weight of DMAC. The viscosity of this polymer solution was 1,650 mPa·s at 80° C. This polymer solution was extruded, while maintained at 80° C., together with a liquid in hollow composed of an aqueous DMAC solution having a concentration of 15% by weight, from a cyclic nozzle having a slit width of 59.5 $\mu$m, then immersed in water at 55° C. that was provided 60 cm below the nozzle, and then wound up at a rate of 70 m/min. Thereafter, in the same manner as in Example 1, a polysulfone type hollow fiber membrane for purifying blood was obtained. The results obtained are shown in Table 1.

EXAMPLE 5

A uniform polymer solution was prepared which was composed of 16 parts by weight of a polysulfone resin (manufactured by AMOCO PERFORMANCE PRODUCTS COMPANY, P-1700), 7.8 parts by weight of polyvinyl pyrrolidone (manufactured by BASF COMPANY, K-89) and 76.2 parts by weight of DMAC. The viscosity of this polymer solution was 2,500 mPa·s at 70° C. This polymer solution was extruded, while maintained at 70° C., together with a liquid in hollow composed of an aqueous DMAC solution having a concentration of 15% by weight from a cyclic nozzle having a slit width of 59.5 $\mu$m, immersed in water at 55° C. that was provided 60 cm blow the nozzle and then wound up at a rate of 70 m/min. Thereafter, in the same manner as in Example 1, a polysulfone type hollow fiber membrane for purifying blood was obtained. The results obtained are shown in Table 1.

EXAMPLE 6

A uniform polymer solution was prepared which was composed of 17 parts by weight of a polysulfone resin (manufactured by AMOCO PERFORMANCE PRODUCTS COMPANY, P-1700), 5.5 parts by weight of polyvinyl pyrrolidone (manufactured by BASF COMPANY, K-92) and 78.5 parts by weight of DMAC. The viscosity of this polymer solution was 2,400 mpa·s at 50° C. This polymer solution was extruded, while maintained at 50° C., together with a liquid in hollow composed of an aqueous DMAC solution having a concentration of 15% by weight, from a cyclic nozzle having a slit width of 59.5 $\mu$m, immersed in water at 55° C. that was provided 60 cm below the nozzle and then wound up at a rate of 70 m/min. Thereafter, in the same manner as in Example 1, a polysulfone type hollow fiber membrane for purifying blood was obtained. The results obtained are shown in Table 1.

EXAMPLE 7

A uniform polymer solution was prepared which was composed of 17 parts by weight of a polysulfone resin (manufactured by AMOCO PERFORMANCE PRODUCTS COMPANY, P-1700), 6.3 parts by weight of polyvinyl pyrrolidone (manufactured by BASF COMPANY, K-89) and 76.7 parts by weight of DMAC. The viscosity of this polymer solution was 2,820 mPa·s at 55° C. This polymer solution was extruded, while maintained at 55° C., together with a liquid in hollow composed of an aqueous DMAC solution having a concentration of 15% by weight, from a cyclic nozzle having a slit width of 59.5 $\mu$m, immersed in water at 55° C. that was provided 60 cm below the nozzle and then wound up at a rate of 70 m/min. Thereafter, in the same manner as in Example 1, a polysulfone type blood-purifying membrane was obtained. The results obtained are shown in Table 1.

EXAMPLE 8

In the same manner as in Example 1, except that a shower of ethanol at 60° C. for 60 minutes was substituted for the shower for 80 minutes of 40% by weight aqueous DMAC solution heated to 85° C., a polysulfone type hollow fiber membrane for purifying blood was obtained. The results obtained are shown in Table 1.

EXAMPLE 9

In the same manner as in Example 1, except that the polymer solution was extruded together with a liquid in hollow composed of an aqueous DMAC solution having a concentration of 15% by weight from a cyclic nozzle having a slit width of 85 $\mu$m in place of the cyclic nozzle having a slit width of 59.5 $\mu$m, a polysulfone type hollow fiber membrane for purifying blood was obtained. The results obtained are shown in Table 1. Moreover, at that time, the linear velocity of extrusion of the polymer solution was 36.9 m/min and the draft ratio was 1.90.

COMPARATIVE EXAMPLE 1

In the same manner as in Example 6, except that the irradiation with $\gamma$-rays of 25 kGy was not conducted, a polysulfone type hollow fiber membrane for dialyzing blood was obtained. The results obtained are shown in Table 1.

COMPARATIVE EXAMPLE 2

In the same manner as in Example 6, except that the hollow fiber membrane was immersed in water in place of the aqueous solution in which 600 ppm of sodium disulfite and 300 ppm of sodium carbonate were dissolved, and irradiation with $\gamma$-rays of 50 kGy was conducted, a polysulfone type hollow fiber membrane for dialyzing blood was obtained. The results obtained are shown in Table 1.

COMPARATIVE EXAMPLE 3

Figure 2A:
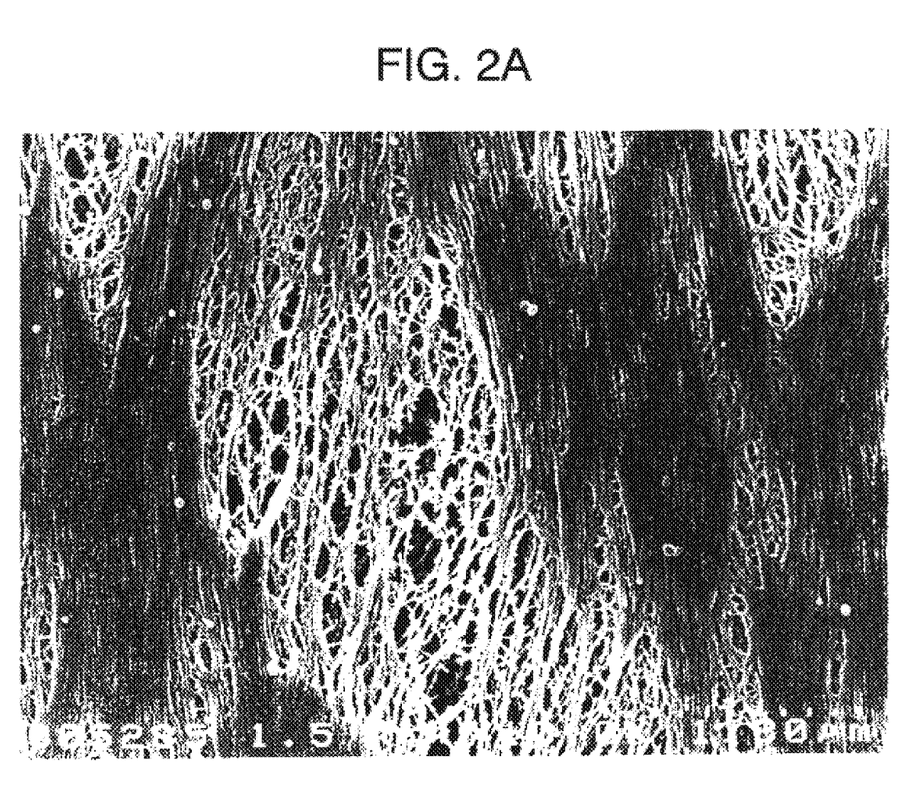
FIGS. 2A and 2B are images obtained by observing the internal surface of the hollow fiber membrane of Comparative Example 3 through a scanning electron microscope (FIG. 2A: at magnification of 10,000, FIG. 2B: at magnification of 30,000). On the internal surface, there are interstices of about 2 μm that seem to have been torn.
Figure 2B:
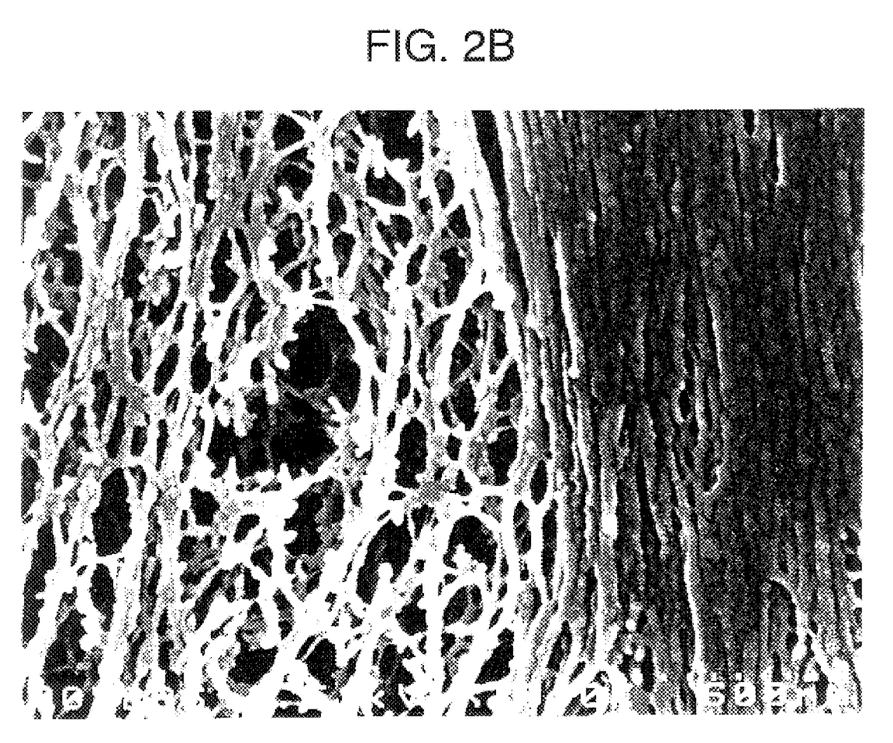

In the same manner as in Example 1, except that the polymer solution was extruded together with a liquid in hollow composed of an aqueous DMAC solution having a concentration of 15% by weight, from a cyclic nozzle having a slit width of 125 $\mu$m in place of the cyclic nozzle having a slit width of 59.5 $\mu$m, a polysulfone type hollow fiber membrane for purifying blood was obtained. The results obtained are shown in Table 1. Moreover, at that time, the draft ratio was 3.2. The internal surface of this membrane had a structure greatly torn by an influence of the draft and the state thereof is shown in FIGS. 2A and 2B.

COMPARATIVE EXAMPLE 4

Figure 3A:
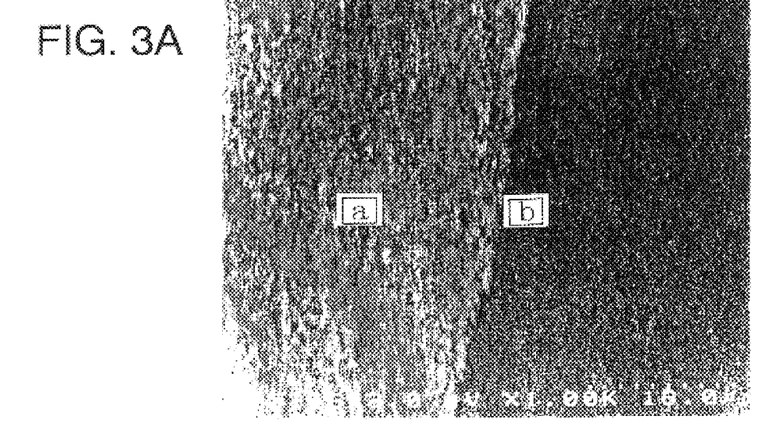
FIG. 3A is an image obtained by observing the internal surface of the hollow fiber membrane of Comparative Example 4 through a scanning electron microscope at a magnification of 1,000. Structure unevenness is seen which seems to result from extrusion unevenness of the polymer solution. The portion where the fibrils exist roughly is referred to as a, the portion where the fibrils exist densely is referred to as b, and images obtained by magnifying them 15,000 times are shown in FIGS. 3B and 3C, respectively.
Figure 3B:
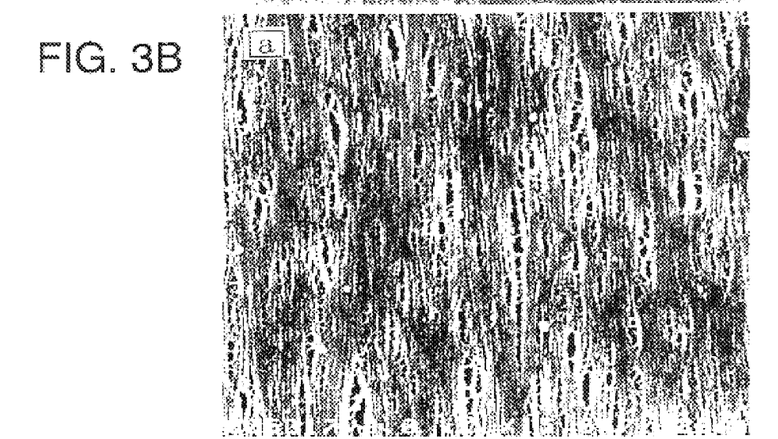
Figure 3C:
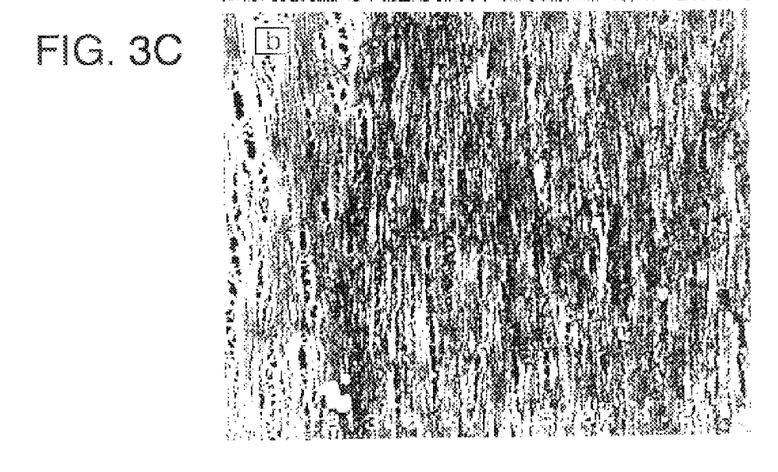

In the same manner as in Example 1, except that the polymer solution was extruded together with a liquid in hollow composed of an aqueous DMAC solution having a concentration of 15% by weight from a cyclic nozzle having a slit width of 50 $\mu$m in place of the cyclic nozzle having a slit width of 59.5 $\mu$m, a polysulfone type hollow fiber membrane for purifying blood was obtained. The results obtained are shown in Table 1. Moreover, at that time, the draft ratio was 1.0. The internal surface of this membrane did not have such a structure as one having been torn because the draft was low; however, structure unevenness was found for an influence which seemed to be due to unevenness of extrusion of the polymer solution. The state thereof is shown in FIGS. 3A and 3B.

COMPARATIVE EXAMPLE 5

A uniform polymer solution was prepared which was composed of 17 parts by weight of a polysulfone resin (manufactured by AMOCO PERFORMANCE PRODUCTS COMPANY, P-1700), 3.5 parts by weight of polyvinyl pyrrolidone (manufactured by BASF COMPANY, K-92) and 79.5 parts by weight of DMAC. The viscosity of this polymer solution was 1,250 mPa·s at 50° C. This polymer solution was extruded, while maintained at 50° C., together with a liquid in hollow composed of an aqueous DMAC solution having a concentration of 15% by weight, from a cyclic nozzle having a slit width of 59.5 μm, immersed in water at 55° C. that was provided 60 cm below the nozzle and then wound up at a rate of 70 m/min. Thereafter, in the same manner as in Example 1, a polysulfone type hollow fiber membrane for purifying blood was obtained. The results obtained are shown in Table 1.

COMPARATIVE EXAMPLE 6

A uniform polymer solution was prepared which was composed of 16 parts by weight of a polysulfone resin (manufactured by AMOCO PERFORMANCE PRODUCTS COMPANY, P-1700), 9 parts by weight of polyvinyl pyrrolidone (manufactured by BASF COMPANY, K-92) and 75 parts by weight of DMAC. The viscosity of this polymer solution was 3,010 mPa·s at 70° C. This polymer solution was extruded, while maintained at 70° C., together with a liquid in hollow composed of an aqueous DMAC solution having a concentration of 15% by weight, from a cyclic nozzle having a slit width of 59.5 μm, immersed in water at 55° C. that was provided 60 cm below the nozzle, and then wound up a t a rate of 70 m/min. Thereafter, in the same manner as in Example 1, a polysulfone type hollow fiber membrane for purifying blood was obtained. Th e membrane obtained was soft, low in strength and easy to break upon touching the same, so that it was impossible to measure the PVP eluted and evaluate performance.

COMPARATIVE EXAMPLE 7

A uniform polymer solution was prepared which was composed of 18 parts by weight of a polysulfone resin (manufactured by AMOCO PERFORMANCE PRODUCTS COMPANY, P-1700), 6.9 parts by weight of polyvinyl pyrrolidone (manufactured by BASF COMPANY, K-92) and 75.1 parts by weight of DMAC. The viscosity of this polymer solution was 7,210 mPa·s at 55° C. This polymer solution was extruded, while maintained at 55° C., together with a liquid in hollow composed of an aqueous DMAC solution having a concentration of 15% by weight, from a cyclic nozzle having a slit width of 59.5 μm, immersed in water at 55° C. that was provided 60 cm below the nozzle and then wound up at a rate of 70 m/min. However, fiber cutting was caused many times during the spinning, though it might be due to high viscosity of the polymer solution, and as to the membrane per se, only a wavy membrane was formed owing to the pulsation due to extrusion failure, and an evaluation was impossible.

COMPARATIVE EXAMPLE 8

In the same manner as in Example 1, except that the extrudate was wound up at a rate of 125 m/min in place of the rate of 70 m/min, a polysulfone type blood-purifying membrane was obtained. The results obtained are shown in Table 1. Incidentally, at that time, the linear velocity of extrusion of the polymer solution was 91.2 m/min and the draft ratio was 1.37. This membrane was unable to be picked because the linear extrusion velocity was too high and fiber-cutting was hence often caused during the spinning and because the sectional shape of the hollow fiber became eccentric during the spinning.

For the hollow fiber membranes of Examples 1 to 9 and Comparative Examples 1 to 5, an evaluation of the residual blood was carried out. That is, 120 hollow fiber membranes having a length of 16 cm were assembled into a module, washed with 20 ml of physiologic saline, and then blood taken out of dog carotid artery through a peristaltic pump was allowed to flow at a flow rate of 2 ml/min inside the hollow fiber for 10 minutes. The blood was pushed out with 5 ml of physiological saline and thereafter the module was taken apart and the degree of residual blood was evaluated. As a result, in the hollow fibers of Comparative Examples 2, 3 and 5, residual blood was found, but in the hollow fibers of the other Comparative Examples and the Examples, residual blood was little or only in a small amount.

INDUSTRIAL APPLICABILITY

In the case of the polysulfone type hollow fiber membrane for purifying blood of this invention, the amount of polyvinyl pyrrolidone eluted from the internal surface side of the hollow fiber membrane, namely on the blood side, is very small, the hollow fiber membrane is one which is excellent in blood compatibility and excellent in molecular weight-fractionating properties. This invention provides an artificial kidney that will be very significant to future dialysis treatment.

TABLE 1

| | PVP content in membrane (%) | Water-soluble PVP in membrane (%) | Surface PVP conc. (%) | Eluted PVP(*) (mg/m²) | Torn structure | Selective separation layer (μm) | Residual blood | Strength (g/hf) | Water permeation(**) | Alb coefficient of screening (%) | β2-Mg coefficient of screening (%) |
|---|---|---|---|---|---|---|---|---|---|---|---|
| Example 1 | 7 | 11.4 | 38 | 0.25 | None | 10.5 | Found | 17.1 | 210 | 0.003 | 0.64 |
| Example 2 | 7.1 | 11.7 | 38 | 0.26 | " | 10.6 | Found | 17.2 | 205 | 0.003 | 0.64 |
| Example 3 | 8.9 | 13.4 | 39 | 1.01 | " | 11.2 | Found | 17.1 | 175 | 0.002 | 0.55 |
| Example 4 | 5 | 13.8 | 35 | 0.27 | " | 4.8 | Found | 19.2 | 287 | 0.004 | 0.68 |
| Example 5 | 8.1 | 11.9 | 44 | 0.25 | " | 8.2 | Found | 16.3 | 165 | 0.004 | 0.61 |
| Example 6 | 4.5 | 17.3 | 30 | 0.41 | " | 9.2 | Found | 19.8 | 514 | 0.005 | 0.7 |
| Example 7 | 5.5 | 14.2 | 33 | 0.3 | " | 7.5 | Found | 19 | 222 | 0.002 | 0.68 |
| Example 8 | 8 | 12 | 37 | 0.9 | " | 10.2 | Found | 17.4 | 188 | 0.002 | 0.57 |
| Example 9 | 7.2 | 11.4 | 38 | 0.28 | " | 10.4 | Found | 17.2 | 222 | 0.003 | 0.65 |

TABLE 1-continued

|  | PVP content in membrane (%) | Water-soluble PVP in membrane (%) | Surface PVP conc. (%) | Eluted PVP(*) (mg/m²) | Torn structure | Selective separation layer (μm) | Residual blood | Strength (g/hf) | Water permeation(**) | Alb coefficient of screening (%) | β2-Mg coefficient of screening (%) |
|---|---|---|---|---|---|---|---|---|---|---|---|
| Comp. Ex. 1 | 4.8 | 89.6 | 31 | 2.2 | " | 10.5 | Found | 17.2 | 229 | 0.003 | 0.63 |
| Comp. Ex. 2 | 4.8 | 0.42 | 31 | 0.1 | " | 11.1 | Found | 17.2 | 209 | 0.003 | 0.67 |
| Comp. Ex. 3 | 7.4 | 10.8 | 37 | 0.25 | Found | 11.5 | Found | 17.7 | 255 | 0.01 | 0.69 |
| Comp. Ex. 4 | 7.3 | 11.1 | 38 | 0.28 | None | 9.2 | None | 17 | 245 | 0.009 | 0.68 |
| Comp. Ex. 5 | 3.2 | 6.3 | 24 | 0.95 | " | 6.8 | Found | 21.2 | 702 | 0.011 | 0.85 |
| Comp. Ex. 6 | 8.9 | 17 | 47 | — | — | — | — | 11.7 | — | — | — |
| Comp. Ex. 7 | — | — | — | — | — | — | — | — | — | — | — |
| Comp. Ex. 8 | — | — | — | — | — | — | — | — | — | — | — |

(*) In Table, eluted PVP means an amount of PVP eluted when 40% ethanol was circulated inside the hollow fiber membrane.
(**) ml/Hr/m²/mmHg
"—" means impossible to measure.

What is claimed is:

1. A polysulfone hollow fiber membrane, containing 1 to 10% by weight of PVP of which 50 to 95% is insoluble in water,
wherein said hollow fiber membrane contains a selective separation layer which forms an internal surface of the hollow fiber membrane and which has an internal surface PVP concentration of 30 to 45% by weight of the total of polysulfone and PVP present on the internal surface.

2. The polysulfone hollow fiber membrane according to claim 1, wherein the internal surface PVP concentration is 33 to 40% by weight of the total of polysulfone and PVP present on the internal surface.

3. The polysulfone hollow fiber membrane according to claim 1, wherein the amount of PVP which is eluted when 40% aqueous alcohol solution is circulated inside the hollow fiber membrane at 37° C. for 4 hours is not more than 0.5 mg per m² of the membrane area.

4. The polysufone hollow fiber membrane according to claim 1, wherein the internal surface of the hollow fiber membrane is free of torn interstices larger than 0.8 μm in size.

5. The polysulfone hollow fiber membrane according to claim 1, wherein the thickness of the selective separation layer is 2 to 15 μm.

6. A process for producing a polysulfone hollow fiber membrane for purifying blood, which comprises subjecting a polymer solution comprising polysulfone polymer and PVP, wherein the concentration of polysulfone polymer in the polymer solution is 15 to 20% by weight and the weight ratio of PVP to the polysulfone polymer is from 0.25 to 0.5,
to extrusion at a viscosity of 1,500 to 6,000 mPa·s, and
to spinning at a draft ratio of 1.1 to 1.9 and at a linear extrusion velocity of not more than 90 m/min, wherein prior to an insolubilization of the PVP, the hollow fiber membrane after the spinning is washed with a solvent which is a mixed solvent of a good solvent and a poor solvent for the polysulfone polymer, to extract and remove the PVP which is weakly incorporated.

7. The process according to claim 6, wherein the hollow fiber membrane obtained by the spinning is placed in a wet state of at least the saturated water content and thereafter irradiated with y-rays to insolubilize 50 to 95% of the PVP in the hollow fiber membrane.

8. The process according to claim 7, wherein the hollow fiber membrane after the spinning but before the irradiation with γ-rays is washed with a solvent which is a mixed solvent of a good solvent and a poor solvent for the polysulfone polymer, to extract and remove the PVP which is weakly incorporated.

9. The process according to claim 7, wherein the hollow fiber membrane after the spinning but before the irradiation with γ-rays is washed with an alcoholic solvent to extract and remove the PVP which is weakly incorporated.

10. A process for producing a polysulfone hollow fiber membrane for purifying blood, which comprises
spinning a hollow fiber membrane using a polymer solution which comprises polysulfone polymer and PVP, wherein the concentration of polysulfone polymer in the polymer solution is 15 to 20% by weight and the weight ratio of PVP to the polysulfone polymer is from 0.25 to 0.5;
washing the hollow fiber membrane after the spinning with a solvent which is mixed solvent of a good solvent and a poor solvent for the polysulfone polymer, to extract and remove the PVP which is weakly incorporated; and
insolubilizing 50 to 95% of the PVP.

11. The process according to claim 10, wherein the PVP is insolubilized by irradiation with γ-rays and the hollow fiber membrane after the spinning is placed in a wet state of at least the saturated water content prior to irradiation.

12. The process according to claim 10, wherein prior to the insolubilization of the PVP, the hollow fiber membrane after the spinning is washed with a solvent which is a mixed solvent of a good solvent and a poor solvent for the polysulfone polymer, to extract and remove the PVP which is weakly incorporated.

13. The process according to claim 10, wherein the good solvent for the polysulfone polymer is dimethylacetamide and/or dimethyl sulfoxide and the poor solvent for the polysulfone polymer is water.

14. The process according to claim 10, wherein prior to the insolubilization of the PVP, the hollow fiber membrane after the spinning is washed with an alcoholic solvent to extract and remove the PVP which is weakly incorporated.

15. The process according to claim 14, wherein the alcoholic solvent is glycerin at 130° C. to 160° C.

* * * * *